United States Patent
Ueno

(10) Patent No.: US 8,379,009 B2
(45) Date of Patent: Feb. 19, 2013

(54) BOOSTER POWER SUPPLY CIRCUIT THAT BOOSTS INPUT VOLTAGE

(75) Inventor: Masaji Ueno, Sagamihara (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1317 days.

(21) Appl. No.: 12/105,575

(22) Filed: Apr. 18, 2008

(65) Prior Publication Data

US 2008/0266228 A1  Oct. 30, 2008

(30) Foreign Application Priority Data

Apr. 20, 2007  (JP) .................................. 2007-112260

(51) Int. Cl.
*G09G 3/36* (2006.01)
(52) U.S. Cl. ......................................... 345/211; 345/98
(58) Field of Classification Search .................. 327/524, 327/530, 534, 535, 536, 537; 345/55, 76, 345/84, 87, 89, 90, 92, 98, 100, 204, 211, 345/212, 213, 214; 363/147
See application file for complete search history.

(56) References Cited

U.S. PATENT DOCUMENTS

| 7,466,189 B2* | 12/2008 | Sohara et al. .................. 327/536 |
| 2004/0021677 A1* | 2/2004 | Sasaki et al. .................. 345/694 |
| 2006/0132417 A1* | 6/2006 | Shigenobu et al. ............. 345/98 |

FOREIGN PATENT DOCUMENTS

JP  2006-178018  7/2006

* cited by examiner

*Primary Examiner* — Amare Mengistu
*Assistant Examiner* — Stacy Khoo
(74) *Attorney, Agent, or Firm* — Turocy & Watson, LLP

(57) ABSTRACT

A first control switch is connected between a first terminal to which one terminal of a first boosting capacitor element is connected and a supply node of an input voltage. A second control switch is connected between a second terminal to which the other terminal of the first boosting capacitor element is connected and the supply node of the input voltage. A first switch element is connected between a third terminal to which one terminal of a second boosting capacitor element is connected and at which an output voltage is generated and the first terminal. A second switch element is connected between a node of a reference voltage side of the input voltage and the second terminal. A control circuit detects the output voltage and controls the first and second control switches to obtain the desired output voltage on the basis of a detection result.

8 Claims, 5 Drawing Sheets

| Mode \ Control signal | φ1 | φ2 | φ3 | φ4 |
|---|---|---|---|---|
| 1 | H | H | L | H |
| 2 | L | L | H | L |

| Mode | Flying capacitor | | φ1 | φ2 | φ3 | φ4 | φ5 | φ6 | φ7 |
|---|---|---|---|---|---|---|---|---|---|
| A | C1 | Charge | H | H | L | H | L | H | L |
| | C2 | Discharge | | | | | | | |
| | C3 | Charge | | | | | | | |
| B | C1 | Discharge | L | L | H | L | H | L | H |
| | C2 | Charge | | | | | | | |
| | C3 | Discharge | | | | | | | |

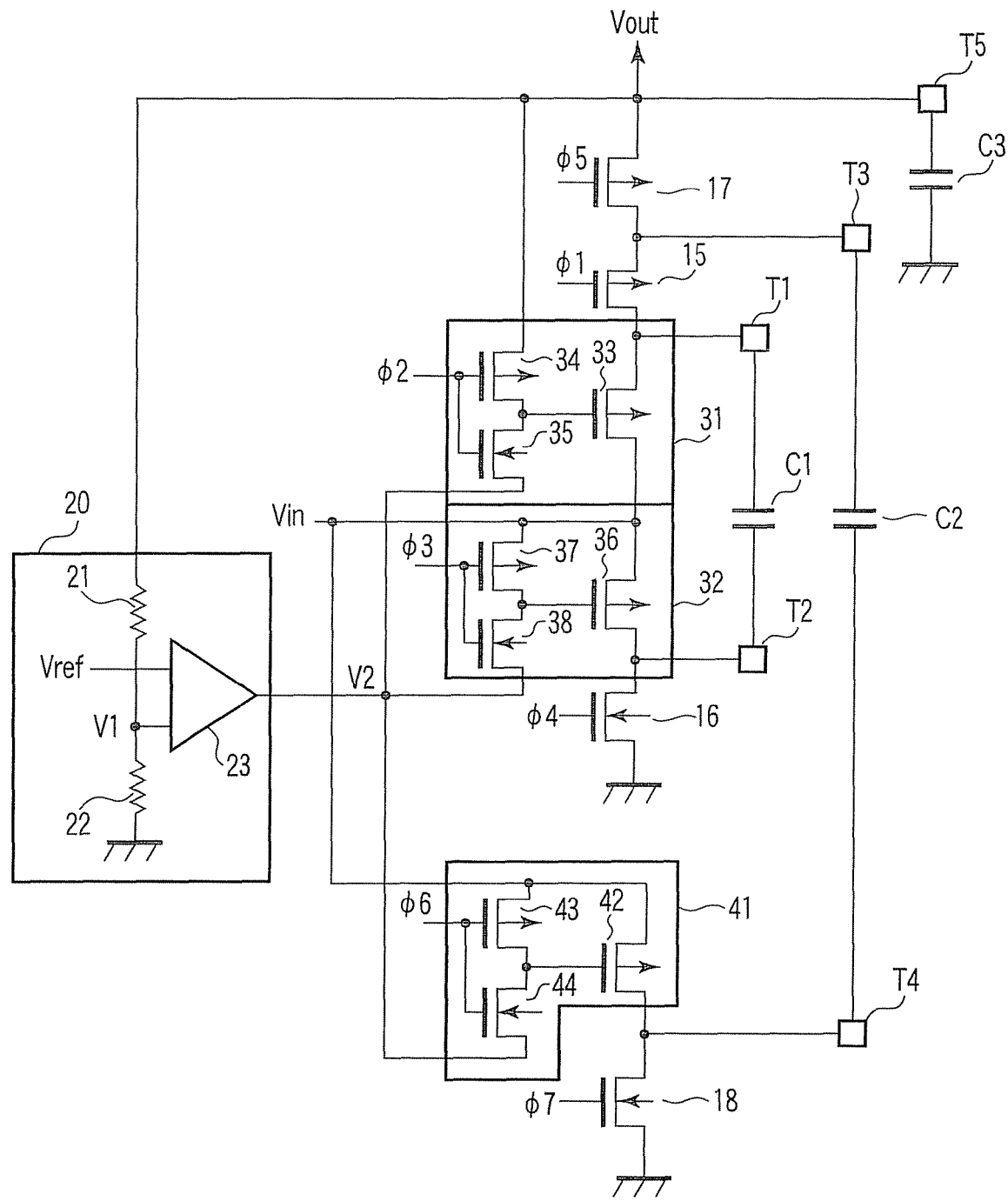
F I G. 6

BOOSTER POWER SUPPLY CIRCUIT THAT BOOSTS INPUT VOLTAGE

CROSS-REFERENCE TO RELATED APPLICATIONS

This application is based upon and claims the benefit of priority from prior Japanese Patent Application No. 2007-112260, filed Apr. 20, 2007, the entire contents of which are incorporated herein by reference.

BACKGROUND OF THE INVENTION

1. Field of the Invention

The present invention relates to a power supply circuit incorporated in a semiconductor integrated circuit and a booster power supply circuit that boosts an input voltage.

2. Description of the Related Art

In a semiconductor integrated circuit operated by a battery voltage, a power supply circuit that stabilizes a power supply voltage is incorporated. Furthermore, a booster power supply circuit that boosts a battery voltage may be incorporated. FIG. 1 shows an example of a conventional booster power supply circuit incorporated in a semiconductor integrated circuit. The booster power supply circuit performs twofold boosting. When switches S2 and S4 are turned on, a capacitor C1 is electrically charged with an input voltage Vin. When switches S1 and S3 are turned on, a capacitor C2 is electrically charged with the input voltage Vin through the capacitor C1. The operations are repeated to generate an output voltage Vout corresponding to 2Vin.

In a conventional circuit, by a simple switch changeover operation, a boosted voltage can be easily obtained. However, when the input voltage Vin changes, the value of the output voltage Vout changes accordingly, and an output voltage having a constant value cannot be always obtained. In order to try to stabilize the obtained output voltage Vout, a circuit configuration becomes complex, and a current consumption increases to deteriorate an output current capability.

In FIG. 7 described in Jpn. Pat. Appln. KOKAI Publication No. 2006-178018, a booster power supply circuit using a plurality of capacitors and a plurality of switches is disclosed.

BRIEF SUMMARY OF THE INVENTION

According to a first aspect of the invention, there is provided a booster power supply circuit comprising: a first voltage control switch circuit connected between a first terminal to which one terminal of a first boosting capacitor element is connected and a supply node of an input voltage, the first voltage control switch circuit having a switch function which controls a resistance between both terminals depending on a first control signal; a second voltage control switch circuit connected between a second terminal to which the other terminal of the first boosting capacitor element is connected and the supply node of the input voltage, the second voltage control switch circuit having a switch function which controls a resistance between both terminals depending on a second control signal; a first switch element connected between a third terminal to which one terminal of a second boosting capacitor element is connected and at which an output voltage is generated and the first terminal, the first switch element being switching-controlled depending on a third control signal; a second switch element connected between a node of a reference voltage side of the input voltage and the second terminal, the second switch element being switching-controlled depending on a fourth control signal; and a control circuit which detects the output voltage generated at the third terminal and controls the first and second voltage control switch circuits such that the output voltage has a desired value depending on a detection result.

According to a second aspect of the invention, there is provided a booster power supply circuit comprising: a first voltage control switch circuit connected between a first terminal to which one terminal of a first boosting capacitor element is connected and a supply node of an input voltage, the first voltage control switch circuit having a switch function which controls a resistance between both terminals depending on a first control signal; a second voltage control switch circuit connected between a second terminal to which the other terminal of the first boosting capacitor element is connected and the supply node of the input voltage, the second voltage control switch circuit having a switch function which controls a resistance between both terminals depending on a second control signal; a first switch element connected between a third terminal to which one terminal of a second boosting capacitor element is connected and the first terminal, the first switch element being switching-controlled depending on a third control signal; a third voltage control switch circuit connected between a fourth terminal to which the other terminal of the second boosting capacitor element is connected and the supply node of the input voltage, the third voltage control switch circuit having a switch function which controls a resistance between both terminals depending on a fourth control signal; a second switch element connected between a fifth terminal to which one terminal of a third boosting capacitor element is connected and at which an output voltage is generated and the third terminal, the second switch element being switching-controlled depending on a fifth control signal; a third switch element connected between a node on a reference voltage side of the input voltage and the second terminal, the third switch element being switching-controlled depending on a sixth control signal; a fourth switch element connected between the node on the reference voltage side of the input voltage and the fourth terminal, the fourth switch element being switching-controlled depending on a seventh control signal; and a control circuit which detects the output voltage generated at the fifth terminal and controls the first, second and third voltage control switch circuits such that the output voltage has a desired value depending on a detection result.

According to a third aspect of the invention, there is provided a liquid crystal display device comprising: a liquid crystal panel having display elements to constitute pixels at intersection points between a plurality of scan lines along a horizontal scan direction and a plurality of signal lines along a vertical scan direction, respectively; a gate driver which drives said plurality of scan lines; and a source driver which selects a gradation voltage depending on image data and drives said plurality of signal lines by the gradation voltage, the source driver having a gradation voltage generator which generates the gradation voltage.

The gradation voltage generator comprises: a first voltage control switch circuit connected between a first terminal to which one terminal of a first boosting capacitor element is connected and a supply node of an input voltage, the first voltage control switch circuit having a switch function which controls a resistance between both terminals depending on a first control signal; a second voltage control switch circuit connected between a second terminal to which the other terminal of the first boosting capacitor element is connected and the supply node of the input voltage, the second voltage control switch circuit having a switch function which controls a resistance between both terminals depending on a second control signal; a first switch element connected between a third terminal to which one terminal of a second boosting capacitor element is connected and at which the gradation voltage is generated and the first terminal, the first switch element being switching-controlled depending on a third control signal; a second switch element connected between a node of a reference voltage side of the input voltage and the second terminal, the second switch element being switching-controlled depending on a fourth control signal; and a control circuit which detects the gradation voltage generated at the third terminal and controls the first and second voltage control switch circuits such that the gradation voltage has a desired value depending on a detection result.

According to a fourth aspect of the invention, there is provided a liquid crystal display device comprising: a liquid crystal panel having display elements to constitute pixels at intersection points between a plurality of scan lines along a horizontal scan direction and a plurality of signal lines along a vertical scan direction, respectively; a gate driver which drives said plurality of scan lines; and a source driver which selects a gradation voltage depending on image data and drives said plurality of signal lines by the gradation voltage, the source driver having a gradation voltage generator which generates the gradation voltage.

The gradation voltage generator comprises: a first voltage control switch circuit connected between a first terminal to which one terminal of a first boosting capacitor element is connected and a supply node of an input voltage, the first voltage control switch circuit having a switch function which controls a resistance between both terminals depending on a first control signal; a second voltage control switch circuit connected between a second terminal to which the other terminal of the first boosting capacitor element is connected and the supply node of the input voltage, the second voltage control switch circuit having a switch function which controls a resistance between both terminals depending on a second control signal; a first switch element connected between a third terminal to which one terminal of a second boosting capacitor element is connected and the first terminal, the first switch element being switching-controlled depending on a third control signal; a third voltage control switch circuit connected between a fourth terminal to which the other terminal of the second boosting capacitor element is connected and the supply node of the input voltage, the third voltage control switch circuit having a switch function which controls a resistance between both terminals depending on a fourth control signal; a second switch element connected between a fifth terminal to which one terminal of a third boosting capacitor element is connected and at which an output voltage is generated and the third terminal, the second switch element being switching-controlled depending on a fifth control signal; a third switch element connected between a node on a reference voltage side of the input voltage and the second terminal, the third switch element being switching-controlled depending on a sixth control signal; a fourth switch element connected between the node on the reference voltage side of the input voltage and the fourth terminal, the fourth switch element being switching-controlled depending on a seventh control signal; and a control circuit which detects the output voltage generated at the fifth terminal and controls the first, second and third voltage control switch circuits such that the output voltage has a desired value depending on a detection result.

BRIEF DESCRIPTION OF THE SEVERAL
VIEWS OF THE DRAWING

FIG. 6 is a circuit diagram showing a configuration of a booster power supply circuit according to a second embodiment of the present invention;

DETAILED DESCRIPTION OF THE INVENTION

A principle of the present invention will be described below with reference to FIG. 2 prior to an explanation of embodiments of the present invention.

Figure 2:
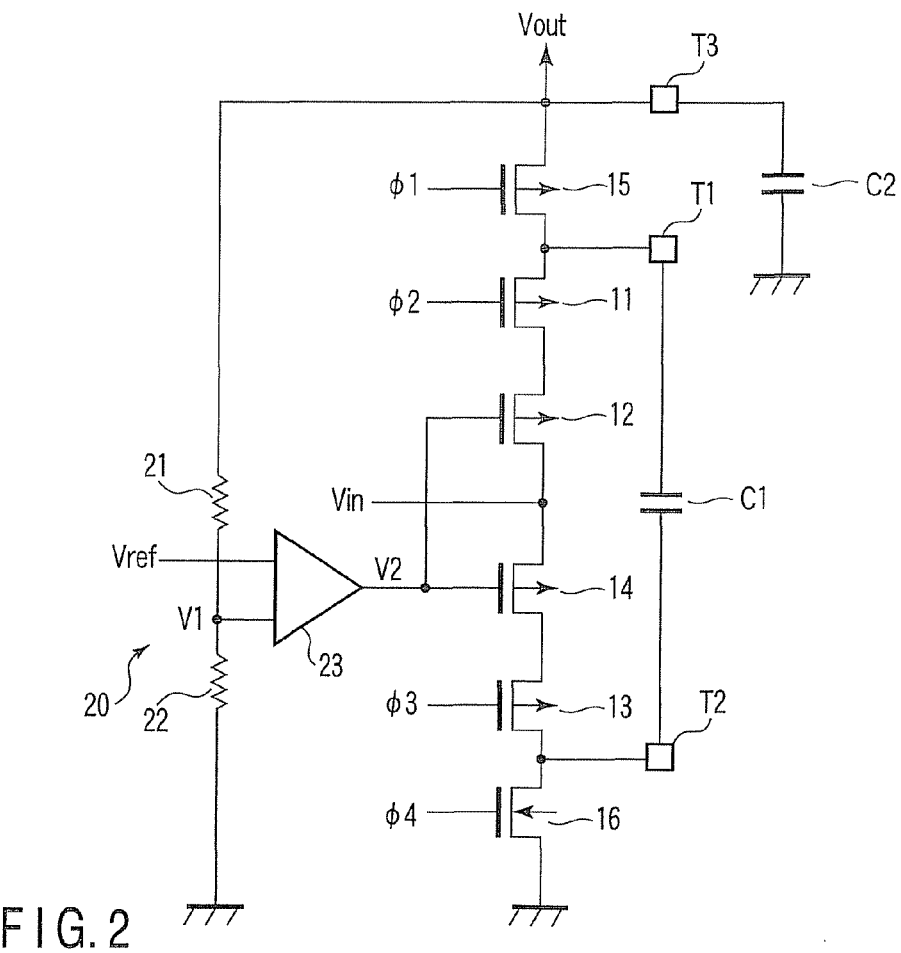
FIG. 2 is a circuit diagram showing an example of the booster power supply circuit.

FIG. 2 shows an example of the booster power supply circuit that twofold-boosts an input voltage. The booster power supply circuit is integrated and circuited on, for example, a semiconductor substrate together with another circuit. Reference symbol Vin is an input voltage to be boosted; Vout is a final output voltage obtained after the boosting; and T1, T2, and T3 are external terminals. The boosting capacitor C1 (first boosting capacitor element) is connected between the terminals T1 and T2. Between the terminal T3 and the ground, the boosting capacitor C2 (second boosting capacitor element) is connected.

Between the terminal T1 and a supply node of the input voltage Vin, a P-channel MOS transistor 11 for switching and a source-drain of a P-channel MOS transistor 12 for voltage control are connected in series with each other. A control signal ϕ2 is supplied to the gate of the P-channel MOS transistor 11, and a control voltage V2 output from a control circuit 20 (to be described below) is supplied to the gate of the P-channel MOS transistor 12.

Between the terminal T2 and the supply node of the input voltage Vin, a P-channel MOS transistor 13 for switching and a source-drain of a P-channel MOS transistor 14 for voltage control are connected in series with each other. A control signal ϕ3 is supplied to the gate of the P-channel MOS transistor 13, and the control voltage V2 output from the control circuit 20 (to be described below) is supplied to the gate of the P-channel MOS transistor 14.

Between the terminal T3 at which the final output voltage Vout is generated and the terminal T1, a source-drain of a P-channel MOS transistor 15 for switching is connected. A control signal ϕ1 is supplied to the gate of the P-channel MOS transistor 15.

A source-drain of an N-channel MOS transistor 16 for switching is connected between a node of the ground and the terminal T2. A control signal ϕ4 is supplied to the gate of the N-channel MOS transistor 16.

The control circuit 20 has a voltage comparing circuit 23 that divides the final output voltage Vout depending on a ratio of one pair of resistors 21 and 22 to detect a difference between a resultant voltage V1 and a reference voltage Vref.

An output voltage of the voltage comparing circuit 23 is supplied to the gates of the MOS transistors 12 and 14 as the control voltage V2.

In the booster power supply circuit having the above configuration, the MOS transistors 15, 11, 13, and 16 for switching are switching-controlled depending on the control signals φ1 to φ4. In this manner, in a first mode, the capacitor C1 is electrically charged with the input voltage Vin. In a second mode, the capacitor C2 is electrically charged with the input voltage Vin through the capacitor C1. These operations are repeated to perform a boosting operation to generate the output voltage Vout.

In the circuit in FIG. 2, furthermore, in the first mode, the source-drain of the P-channel MOS transistor 12 for voltage control is connected in series with an electric charging path for the capacitor C1. Since the control voltage V2 depending on a difference between the voltage V1 and the reference voltage Vref is supplied to the gate of the MOS transistor 12, a resistance between the source and the drain of the MOS transistor 12 depends on the control voltage V2. As a result, an electric charging voltage for the capacitor C1 depends on the resistance of the P-channel MOS transistor 12. Also in the second mode, a source-drain of the P-channel MOS transistor 14 for voltage control is connected in series with an electric charging path for the capacitor C2. Since the control voltage V2 depending on a difference between the voltage V1 and the reference voltage Vref is supplied to the gate of the P-channel MOS transistor 14, a resistance between the source and the drain of the MOS transistor 14 is a value depending on the control voltage V2. In this manner, an electric charging voltage for the capacitor C2 depends on the resistance of the MOS transistor 14.

Figure 1:
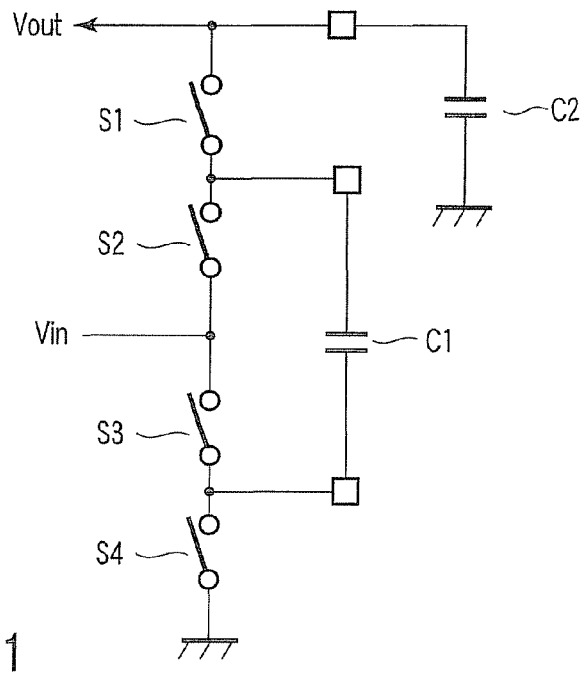
FIG. 1 is a circuit diagram showing an example of a conventional booster power supply circuit incorporated in a semiconductor integrated circuit.

These operations are performed, twofold boosting is performed, and the value of the output voltage Vout is controlled to be a constant value depending on the reference voltage Vref. In the circuit shown in FIG. 1, when the input voltage Vin is, for example, 2.5 to 3.6 V, the output voltage Vout is 5 to 7.2 V. In the circuit shown in FIG. 2, for example, when Vout=5 V is given, the output voltage Vout can be controlled to be a constant voltage within the range of input voltage Vin=2.5 to 3.6 V.

1. First Embodiment

A first embodiment of the present invention will be described below.

Figures 3, 4:
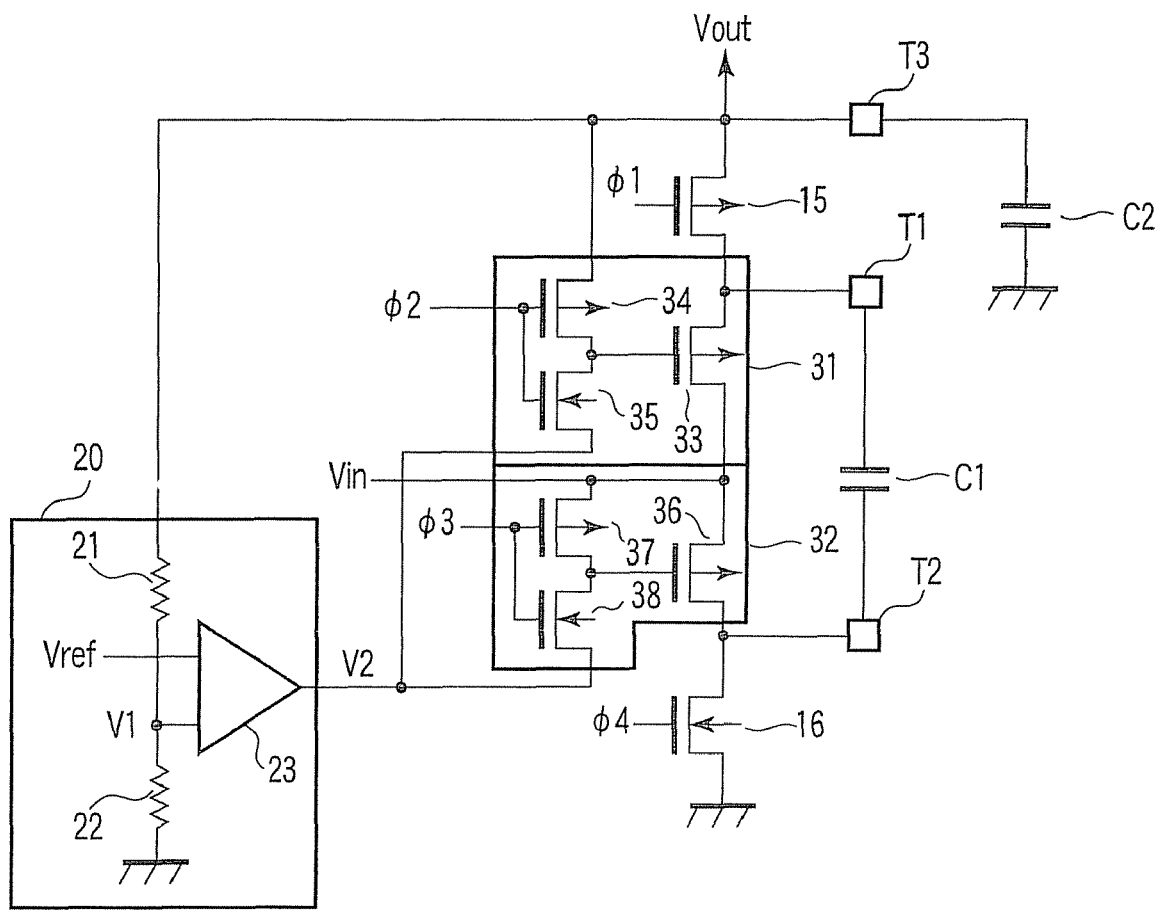
FIG. 3 is a circuit diagram showing a configuration of a booster power supply circuit according to a first embodiment of the present invention.
FIG. 4 is a diagram showing a control signal in an operation mode of the booster power supply circuit according to the first embodiment.

FIG. 3 shows a configuration of a booster power supply circuit according to the first embodiment of the present invention. In the circuit according to the embodiment shown in FIG. 3, a voltage control switch circuit 31 having a switching function that controls a resistance between both the terminals depending on a control signal φ2 is arranged in place of the two P-channel MOS transistors 11 and 12 in FIG. 2. Furthermore, in place of the two P-channel MOS transistors 13 and 14, a voltage control switch circuit 32 having a switching function that controls a resistance between both the terminals depending on a control signal φ3 is arranged. Since a configuration except for the voltage control switch circuits 31 and 32 is the same as that in FIG. 2, a description thereof will be omitted.

The voltage control switch circuit 31 has a P-channel MOS transistor 33, a P-channel MOS transistor 34, and an analog switch element (in this example, an N-channel MOS transistor 35). A current path between the source and the drain of the P-channel MOS transistor 33 is connected between a terminal T1 and a supply node of an input voltage Vin. A current path between the source and the drain of the P-channel MOS transistor 34 is connected between a terminal T3 and the gate of the P-channel MOS transistor 33. The analog switch element (in this example, the N-channel MOS transistor 35) is connected between the gate of the P-channel MOS transistor 33 and an output node of the control circuit 20.

The voltage control switch circuit 32 has a P-channel MOS transistor 36, a P-channel MOS transistor 37, and an analog switch element (in this example, an N-channel MOS transistor 38). A current path between the source and the drain of the P-channel MOS transistor 36 is connected between a terminal T2 and the supply node of the input voltage Vin. A current path between the source and the drain of the P-channel MOS transistor 37 is connected between the supply node of the input voltage Vin and the gate of the P-channel MOS transistor 36. The analog switch element (in this example, the N-channel MOS transistor 38) is connected between the gate of the P-channel MOS transistor 36 and the output node of the control circuit 20.

The gate of the P-channel MOS transistor 34 and the gate of the N-channel MOS transistor 35 are commonly connected. A control signal φ2 (the voltage control switch circuit 31 side) is supplied to the connected gates. The gate of the P-channel MOS transistor 37 and the gate of the N-channel MOS transistor 38 are commonly connected. A control signal φ3 (the voltage control switch circuit 32 side) is supplied to the connected gates.

This example has described the configuration in which the analog switch element includes only the N-channel MOS transistor 35 or 38. However, the analog switch element may include P-channel and N-channel MOS transistors in which current paths between the sources and the drains are connected in parallel.

An operation in the booster power supply circuit according to the first embodiment will be described below. FIG. 4 is a diagram showing states of control signals φ1, φ2, φ3, and φ4 in first and second modes in the booster power supply circuit according to the first embodiment.

In the booster power supply circuit having the configuration, in the first mode, the control signal φ2 is set to "1" (high), the analog switch element in the voltage control switch circuit 31, i.e., the N-channel MOS transistor 35 is energized, and the control voltage V2 output from the control circuit 20 is supplied to the gate of the P-channel MOS transistor 33 through the N-channel MOS transistor 35. In this manner, an on-resistance of the P-channel MOS transistor 33 in the voltage control switch circuit 31 is controlled.

In the first mode, the control signal φ4 is set to "1", and the N-channel MOS transistor 16 is energized. At this time, the control signal φ3 is set to "0" (low), the P-channel MOS transistor 37 in the voltage control switch circuit 32 is energized, and the input voltage Vin is supplied to the gate of the P-channel MOS transistor 36 through the P-channel MOS transistor 37. For this reason, the P-channel MOS transistor 36 in the voltage control switch circuit 32 is de-energized. In this manner, in the first mode, the capacitor C1 is electrically charged through the P-channel MOS transistor 33 in the voltage control switch circuit 31 the on-resistance of which is controlled.

In the second mode, the control signal φ3 is set to "1", the analog switch element, i.e., the N-channel MOS transistor 38 in the voltage control switch circuit 32 is energized, and the control voltage V2 output from the control circuit 20 is supplied to the gate of the P-channel MOS transistor 36 through the N-channel MOS transistor 38. In this manner, the on-resistance of the P-channel MOS transistor 36 in the voltage control switch circuit 32 is controlled.

Furthermore, in the second mode, the control signal φ1 is set to "0", and the P-channel MOS transistor 15 is energized. At this time, the control signal φ2 is set to "0", the P-channel MOS transistor 34 in the voltage control switch circuit 31 is energized, and the output voltage Vout is supplied to the gate of the P-channel MOS transistor 33 through the P-channel MOS transistor 34. For this reason, the P-channel MOS transistor 33 in the voltage control switch circuit 31 is de-energized. Therefore, in the second mode, the capacitor C2 is electrically charged through the P-channel MOS transistor 36 and the capacitor C1 in the voltage control switch circuit 32 the on-resistance of which is controlled.

As described above, even in the booster power supply circuit in FIG. 3, when the capacitors C1 and C2 are electrically charged, the on-resistances of the P-channel MOS transistors 33 and 36 in the voltage control switch circuits 31 and 32 are controlled depending on the control voltage V2 output from the control circuit 20. In this manner, the value of the output voltage Vout is controlled to be a constant value depending on the reference voltage Vref.

In the booster power supply circuit in FIG. 2 described above, the source-drains of the two P-channel MOS transistors 11 and 12 are connected in series with each other between the terminal T1 and the supply node of the input voltage Vin. Similarly, the source-drains of the two P-channel MOS transistors 13 and 14 are connected in series with each other between the terminal T2 and the supply node of the input voltage Vin. More specifically, when the capacitors C1 and C2 are electrically charged, the on-resistors of the two or three P-channel MOS transistors are connected in series with the electric charging paths for the capacitors C1 and C2. Therefore, a current consumption in the electric charging path increases, and an output current capability decreases when an input voltage is minimum.

In contrast to this, in the circuit according to the embodiment shown in FIG. 3, the source-drain of the one P-channel MOS transistor 33 in the voltage control switch circuit 31 is connected between the terminal T1 and the supply node of the input voltage Vin. Similarly, the source-drain of the one P-channel MOS transistor 36 in the voltage control switch circuit 32 is merely connected between the terminal T2 and the supply node of the input voltage Vin. More specifically, when the capacitors C1 and C2 are electrically charged, the on-resistance of one or two transistors is connected in series with the electrical charging path. Therefore, in comparison with FIG. 2, a current consumption can be reduced, and an output current capability obtained when the input voltage is minimum can be prevented from being reduced.

When the circuits in FIGS. 2 and 3 are compared with each other, only the two P-channel MOS transistors 11 and 12 or the two P-channel MOS transistors 13 and 14 may be required in the circuit in FIG. 2. In contrast to this, in the voltage control switch circuit 31 or 32, three MOS transistors are necessary. However, the MOS transistors 34 and 35 or 37 and 38 in the voltage control switch circuits 31 and 32 may only have a current drivability enough to drive the gate of the P-channel MOS transistor 33 or 36. The transistor sizes of the MOS transistors 34 and 35 or 37 and 38 may be sufficiently smaller than that of the P-channel MOS transistor 33 or 36. For example, the channel widths W of the P-channel MOS transistors 11, 12, or the like are 3200 μm. The channel widths W of the P-channel MOS transistors 34 and 35 or 37 and 38 in the voltage control switch circuits 31 and 32 may be about 10 μm. Therefore, in the circuit in FIG. 3, unlike in the circuit shown in FIG. 2, an occupied area is small when the circuit is integrated, and a current consumption becomes small. In this manner, as described above, an output current capability obtained when the input voltage is minimum can be prevented from being decreased.

Figures 5, 7:
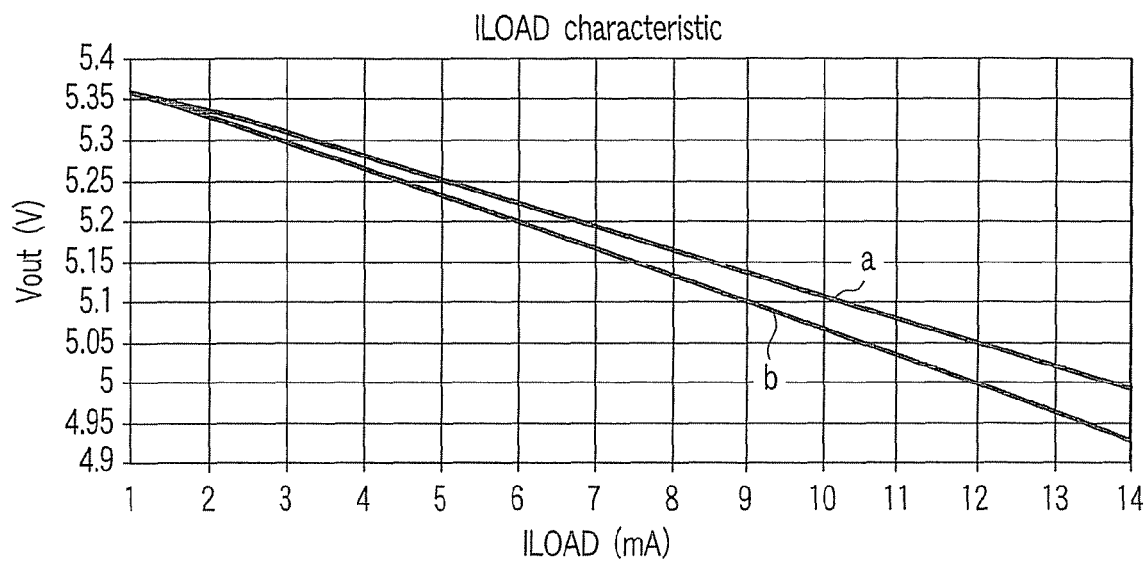
FIG. 5 is a graph showing load characteristics in the booster power supply circuits in FIGS. 2 and 3 such that the load characteristics are compared with each other.
FIG. 7 is a diagram showing a control signal in an operation mode of the booster power supply circuit according to the second embodiment.

In FIG. 5, load characteristics (ILOAD characteristics) representing relationships between final output voltages Vout and load currents ILOAD in the circuits in FIGS. 2 and 3 are contrasted with each other. A characteristic "a" is of the circuit in FIG. 3, and a characteristic "b" is of the circuit in FIG. 2. As shown in FIGS. 2 and 3, it is apparent that the load characteristic of the characteristic "a" is improved in comparison with the characteristic "b".

2. Second Embodiment

A second embodiment of the present invention will be described below.

FIG. 6 shows a configuration of a booster power supply circuit according to the second embodiment of the present invention. In the first embodiment, a booster power supply circuit that performs twofold boosting has been described. In the second embodiment, a booster power supply circuit that performs threefold boosting will be described below.

The circuit according to the second embodiment is different from the circuit in FIG. 3 in that external terminals T1 to T5 are arranged, a capacitor C1 for boosting is connected between the terminals T1 and T2, a capacitor C2 for boosting is connected between the terminals T3 and T4, and a capacitor C3 is connected between the terminal T5 and the ground. Furthermore, the circuit is different from the circuit in FIG. 3 in that a voltage control switch circuit 41, a P-channel MOS transistor 17 and an N-channel MOS transistor 18 for switching are added.

Operations (A mode and B mode) in the booster power supply circuit according to the second embodiment will be described below. FIG. 7 is a diagram showing states of control signals φ1, φ2, φ3, φ4, φ5, φ6, and φ7 in A mode and B mode in the booster power supply circuit according to the second embodiment.

In A mode, the capacitors C1 and C3 are electrically charged, and the capacitor C2 is electrically discharged. Operations performed at this time are as follows. The control signal φ2 is set to "1" (high), and an analog switch element (N-channel MOS transistor 35) in a voltage control switch circuit 31 is energized. In this case, a control voltage V2 output from a control circuit 20 is supplied to the gate of a P-channel MOS transistor 33 through the N-channel MOS transistor 35. In this manner, the on-resistance of the P-channel MOS transistor 33 in the voltage control switch circuit 31 is controlled by the control voltage V2.

Furthermore, in A mode, the control signal φ4 is set to "1", and an N-channel MOS transistor 16 is energized. At this time, the control signal φ3 is set to "0" (low), and a P-channel MOS transistor 37 in a voltage control switch circuit 32 is energized. At this time, an input voltage Vin is supplied to the gate of a P-channel MOS transistor 36 through the P-channel MOS transistor 37. For this reason, the P-channel MOS transistor 36 in the voltage control switch circuit 32 is de-energized. In this manner, the capacitor C1 is electrically charged through the P-channel MOS transistor 33 in the voltage control switch circuit 31 the on-resistance of which is controlled.

Furthermore, in A mode, the control signal φ7 is set to "0", and the N-channel MOS transistor 18 is de-energized. The control signal φ1 is set to "1", and the P-channel MOS transistor 15 is de-energized. The control signal φ5 is set to "0", and the P-channel MOS transistor 17 is energized. At this time, the control signal φ6 is set to "1", and an N-channel MOS transistor 44 in the voltage control switch circuit 41 is energized. In this case, the control voltage V2 output from the control circuit 20 is supplied to the gate of a P-channel MOS transistor 42 through the N-channel MOS transistor 44. In this manner, the on-resistance of the P-channel MOS transistor 42 in the voltage control switch circuit 41 is controlled by the control voltage V2. As a result, the capacitor C3 is electrically charged through the P-channel MOS transistor 42, the capacitor C2, and the P-channel MOS transistor 17 in the voltage control switch circuit 41 the on-resistance of which is controlled.

On the other hand, in B mode, the capacitor C2 is electrically charged, and the capacitors C1 and C3 are electrically discharged. Operations performed at this time are as follows. The control signal φ3 is set to "1", and the analog switch element (N-channel MOS transistor 38) in the voltage control switch circuit 32 is energized. At this time, the control voltage V2 output from the control circuit 20 is supplied to the gate of the P-channel MOS transistor 36 through the N-channel MOS transistor 38. In this manner, the on-resistance of the P-channel MOS transistor 36 in the voltage control switch circuit 32 is controlled.

Furthermore, in B mode, the control signal φ1 is set to "0", and the P-channel MOS transistor 15 is energized. The control signal φ5 is set to "1", and the P-channel MOS transistor 17 is de-energized. The control signal φ4 is set to "0", and the N-channel MOS transistor 16 is de-energized. At this time, the control signal φ2 is set to "0", and the P-channel MOS transistor 34 in the voltage control switch circuit 31 is energized. At this time, an output voltage Vout is supplied to the gate of the P-channel MOS transistor 33 through the P-channel MOS transistor 34. In this manner, the P-channel MOS transistor 33 in the voltage control switch circuit 31 is de-energized.

In addition, in B mode, the control signal φ7 is set to "1", and the N-channel MOS transistor 18 is energized. At this time, the control signal φ6 is set to "0", and the P-channel MOS transistor 43 in the voltage control switch circuit 41 is energized. As a result, the input voltage Vin is supplied to the gate of the P-channel MOS transistor 42 through the P-channel MOS transistor 43. Accordingly, the P-channel MOS transistor 42 in the voltage control switch circuit 41 is de-energized. As a result, the capacitor C2 is electrically charged through the P-channel MOS transistor 36, the capacitor C1, and the P-channel MOS transistor 15 in the voltage control switch circuit 32 the on-resistance of which is controlled.

These operations are repeated to perform threefold boosting, and the value of the output voltage Vout is controlled to be a constant value depending on a reference voltage Vref.

Even in the booster power supply circuit according to the second embodiment, as in the first embodiment, even though an input voltage changes, a constant output voltage can be always obtained, and an output current capability can be prevented from being deteriorated.

3. Third Embodiment

A third embodiment of the present invention will be described below. In this third embodiment, an example in which the booster power supply circuits according to the first and second embodiments are used as a power supply circuit (gradation voltage generator described later) included in a liquid crystal display device will be described below.

Figure 8:
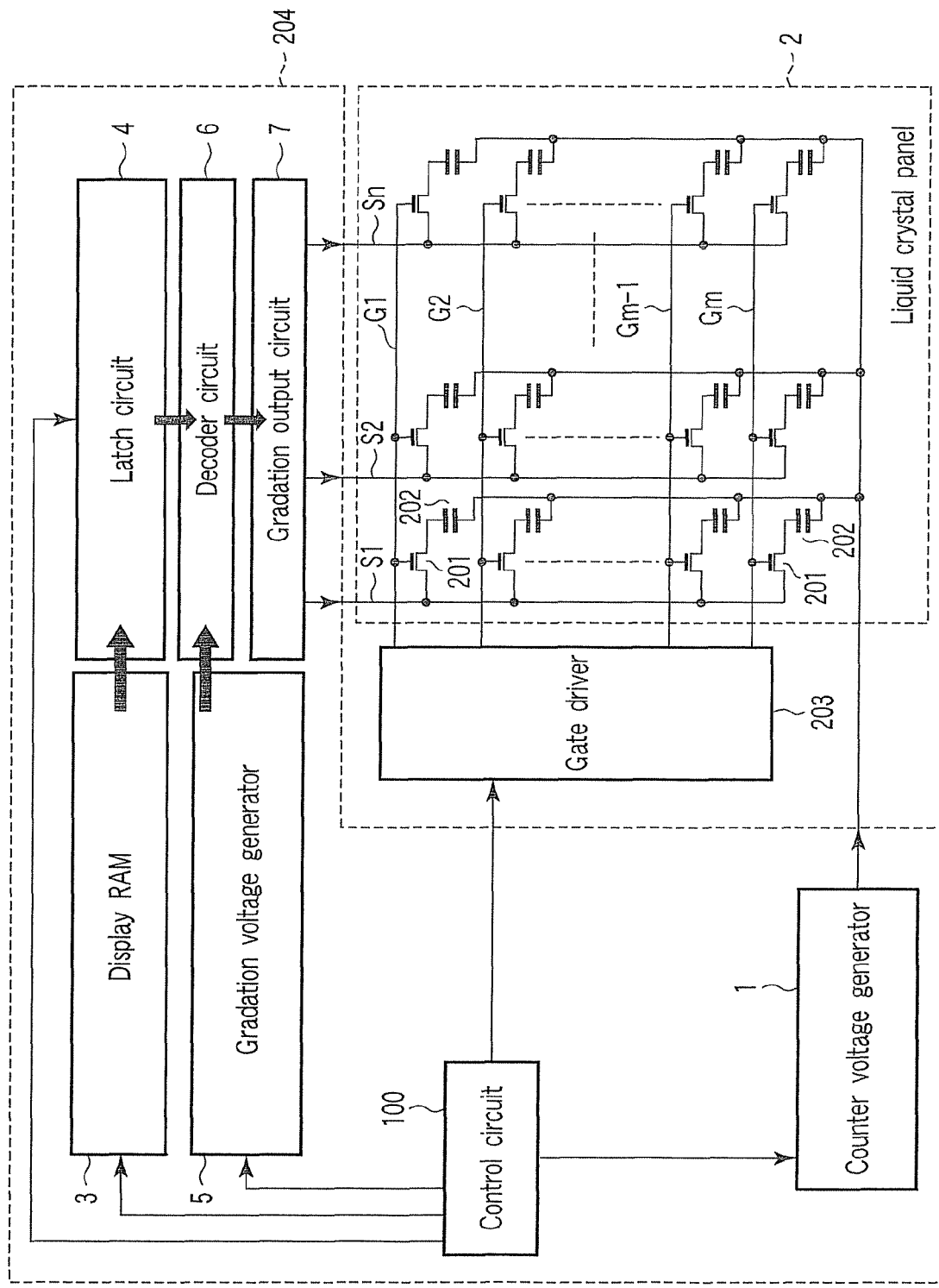
FIG. 8 is a block diagram showing a configuration of a liquid crystal display device according to a third embodiment of the present invention.

FIG. 8 is a block diagram showing a configuration of a liquid crystal display device according to the third embodiment of the present invention.

In FIG. 8, the liquid crystal display device includes a liquid crystal panel 2, a source driver 204, and a gate driver 203. The source driver 204 includes a counter voltage generator 1, a display RAM 3, a latch circuit 4, a gradation voltage generator 5, a decoder circuit 6, a gradation output circuit 7, and a control circuit 100. The counter voltage generator 1 includes a binary output circuit, and is connected to the liquid crystal panel 2.

In the liquid crystal panel 2, a plurality of scan lines G1 to Gm along a horizontal scan direction and a plurality of signal lines S1 to Sn along a vertical scan direction are arranged. Thin film transistors 201 are arranged at intersection points between the signal lines S1 to Sn and the scan lines G1 to Gm. Sources (S) of the transistors 201 are connected to the signal lines S1 to Sn, and gates (G) of the thin film transistors 201 are connected to the scan lines G1 to Gm, respectively. Capacitors 202 are connected to drains (D) of the transistors 201 connected to the scan lines G1 to Gm, and the capacitors 202 are coupled to the signal lines S1 to Sn, respectively. The capacitor 202 serves as a display element capacitor. Counter electrodes of the capacitor 202 are connected to the counter voltage generator 1.

The control circuit 100 controls the counter voltage generator 1, the display RAM 3, the latch circuit 4, the gradation voltage generator 5, and the gate driver 203.

The source driver 204 selects a gradation voltage generated by the gradation voltage generator 5 depending on image data to thereby drive the plurality of signal lines S1 to Sn by the gradation voltage. The display RAM 3 has a memory area which can store image data of an entire display screen. The image data read from the display RAM 3 is latched by the latch circuit 4. The image data latched by the latch circuit 4 is output to the decoder circuit 6. A gradation voltage is supplied from the gradation voltage generator 5 to the decoder circuit 6. In this case, the gradation voltage generator 5 includes the booster power supply circuit according to the first or second embodiment. The gradation voltage generator 5 supplies a voltage, which is twofold-boosted or threefold-boosted, to the decoder circuit 6 as a gradation voltage. In the decoder circuit 6, a gradation voltage depending on the image data is selected, and the gradation voltage is output to the signal lines S1 to Sn through the gradation output circuit 7. The gate driver 203 switches the scan lines G1 to Gm under the control of the control circuit 100.

In the booster power supply circuit according to the third embodiment, the gradation voltage generator 5 includes the booster power supply circuits according to the first and second embodiments, so that a constant gradation voltage can be always supplied to the liquid crystal panel regardless of a change in input voltage. In this manner, a defective display generated by a change in gradation voltage can be prevented.

As described above, the embodiments of the present invention can provide a booster power supply circuit that can always obtain a predetermined output voltage regardless of a change in input voltage and can prevent an output current capability from being deteriorated.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:
1. A booster power supply circuit comprising:
a first voltage control switch circuit connected between a first terminal to which one terminal of a first boosting capacitor element is connected and a supply node of an input voltage, the first voltage control switch circuit having a switch function which controls a resistance between both terminals depending on a first control signal;

a second voltage control switch circuit connected between a second terminal to which the other terminal of the first boosting capacitor element is connected and the supply node of the input voltage, the second voltage control switch circuit having a switch function which controls a resistance between both terminals depending on a second control signal;

a first switch element connected between a third terminal to which one terminal of a second boosting capacitor element is connected and at which an output voltage is generated and the first terminal, the first switch element being switching-controlled depending on a third control signal;

a second switch element connected between a node of a reference voltage side of the input voltage and the second terminal, the second switch element being switching-controlled depending on a fourth control signal; and a control circuit which detects the output voltage generated at the third terminal and controls the first and second voltage control switch circuits such that the output voltage has a desired value depending on a detection result, wherein the first voltage control switch circuit has:

a first MOS transistor of a first channel type having a current path connected between the first terminal and the supply node of the input voltage;

a second MOS transistor of a first channel type having a current path connected between the third terminal and a gate of the first MOS transistor; and a first analog switch element having a current path connected between the pate of the first MOS transistor and an output node of the control circuit and including at least a third MOS transistor of a second channel type, the second voltage control switch circuit has:

a fourth MOS transistor of a first channel type having a current path connected between the second terminal and the supply node of the input voltage;

a fifth MOS transistor of a first channel type having a current path connected between the supply node of the input voltage and a gate of the fourth MOS transistor; and a second analog switch element having a current path connected between the gate of the fourth MOS transistor and the output node of the control circuit and including at least a sixth MOS transistor of a second channel type, both the second MOS transistor and the first analog switch element are energized and controlled by the first control signal, and both the fifth MOS transistor and the second analog switch element are energized and controlled by the second control signal.

2. The booster power supply circuit according to claim 1, having:

a first mode in which the first and fourth control signals are activated to energize the first voltage control switch circuit and the second switch element, and the first boosting capacitor element is electrically charged by the input voltage; and a second mode in which the second and third control signals are activated to energize the second voltage control switch circuit and the first switch element, and the second boosting capacitor element is electrically charged by the input voltage through the first boosting capacitor element in series.

3. The booster power supply circuit according to claim 1, wherein
the control circuit has a voltage comparing circuit which detects a difference between the output voltage generated at the third terminal and the reference voltage.

4. The booster power supply circuit according to claim 1, wherein the second and third MOS transistors have transistor sizes smaller than that of the first MOS transistor, and
the fifth and sixth MOS transistors have transistor sizes smaller than that of the fourth MOS transistor.

5. A liquid crystal display device comprising:

a liquid crystal panel having display elements to constitute pixels at intersection points between a plurality of scan lines along a horizontal scan direction and a plurality of signal lines along a vertical scan direction, respectively;

a gate driver which drives said plurality of scan lines; and a source driver which selects a gradation voltage depending on image data and drives said plurality of signal lines by the gradation voltage, the source driver having a gradation voltage generator which generates the gradation voltage, wherein the gradation voltage generator comprises:

a first voltage control switch circuit connected between a first terminal to which one terminal of a first boosting capacitor element is connected and a supply node of an input voltage, the first voltage control switch circuit having a switch function which controls a resistance between both terminals depending on a first control signal;

a second voltage control switch circuit connected between a second terminal to which the other terminal of the first boosting capacitor element is connected and the supply node of the input voltage, the second voltage control switch circuit having a switch function which controls a resistance between both terminals depending on a second control signal;

a first switch element connected between a third terminal to which one terminal of a second boosting capacitor element is connected and at which the gradation voltage is generated and the first terminal, the first switch element being switching-controlled depending on a third control signal;

a second switch element connected between a node of a reference voltage side of the input voltage and the second terminal, the second switch element being switching-controlled depending on a fourth control signal; and a control circuit which detects the gradation voltage generated at the third terminal and controls the first and second voltage control switch circuits such that the gradation voltage has a desired value depending on a detection result, wherein the first voltage control switch circuit has:

a first MOS transistor of a first channel type having a current path connected between the first terminal and the supply node of the input voltage;

a second MOS transistor of a first channel type having a current path connected between the third terminal and a gate of the first MOS transistor; and a first analog switch element having a current path connected between the gate of the first MOS transistor and an output node of the control circuit and including at least a third MOS transistor of a second channel type, the second voltage control switch circuit has:

a fourth MOS transistor of a first channel type having a current path connected between the second terminal and the supply node of the input voltage;

a fifth MOS transistor of a first channel type having a current path connected between the supply node of the input voltage and a gate of the fourth MOS transistor; and a second analog switch element having a current path connected between the gate of the fourth MOS transistor and the output node of the control circuit and including at least a sixth MOS transistor of a second channel type, both the second MOS transistor and the first analog switch element are energized and controlled by the first control signal, and both the fifth MOS transistor and the second analog switch element are energized and controlled by the second control signal.

6. The liquid crystal display device according to claim 5, having:

a first mode in which the first and fourth control signals are activated to energize the first voltage control switch circuit and the second switch element, and the first boosting capacitor element is electrically charged by the input voltage; and a second mode in which the second and third control signals are activated to energize the second voltage control switch circuit and the first switch element, and the second boosting capacitor element is electrically charged by the input voltage through the first boosting capacitor element in series.

7. The liquid crystal display device according to claim 5, wherein the control circuit has a voltage comparing circuit which detects a difference between the output voltage generated at the third terminal and the reference voltage.

8. The liquid crystal display device according to claim 5, wherein the second and third MOS transistors have transistor sizes smaller than that of the first MOS transistor, and the fifth and sixth MOS transistors have transistor sizes smaller than that of the fourth MOS transistor.

* * * * *